United States Patent [19]
Planker et al.

[11] 3,931,321
[45] Jan. 6, 1976

[54] PROCESS FOR THE PREPARATION OF O-AMINOTHIOPHENOLS

[75] Inventors: Siegfried Planker; Konrad Baessler, both of Frankfurt am Main, Germany

[73] Assignee: Hoechst Aktiengesellschaft, Frankfurt, Germany

[22] Filed: Oct. 24, 1974

[21] Appl. No.: 517,791

Related U.S. Application Data

[63] Continuation of Ser. No. 258,312, May 31, 1972, abandoned.

[30] Foreign Application Priority Data

June 4, 1971 Germany............................ 2127898

[52] U.S. Cl................................. 260/580; 260/306
[51] Int. Cl.²......................................... C07C 85/11
[58] Field of Search .................................... 260/580

[56] References Cited
UNITED STATES PATENTS 1,933,217  10/1933  Lantz.................................. 260/580

2,894,035  8/1959  Latourette .......................... 260/580

OTHER PUBLICATIONS

Houben–Weyl, "Methoden dos Organischen Chem.," 4th Ed., Vol. 9, pp. 7–8 and 23–28 (1958).

Primary Examiner—R. V. Hines
Attorney, Agent, or Firm—Connolly and Hutz

[57] ABSTRACT

Preparation and isolation in substance of ortho-aminothiphenols by the reduction of ortho-chloronitrobenzenes with hydrogensulfides or sulfides, subsequent neutralization in the presence of sulfites, hydrogensulfites or disulfites, separation and following purification of the crude products. The ortho-aminothiophenols are obtained in very good yields and with a high degree of purity. Oxydation to the disulfide compound is avoided by the processes of the invention.

6 Claims, No Drawings

PROCESS FOR THE PREPARATION OF O-AMINOTHIOPHENOLS

This application is a continuation of application Ser. No. 258,312 filed May 31, 1972 and now abandoned.

The present invention relates to a process for the preparation of o-aminothiophenols.

O-aminothiophenol compounds are important intermediates for the preparation of dyestuffs, pharmaceutics and herbicides, known in the art.

The most simple way of preparing these compounds is the reaction of o-chloronitrobenzene with sodium hydrogensulfide (NaHS) or sodium sulfide ($Na_2S$) in an alkaline, aqueous medium at temperatures above 80°C to yield o-aminothiophenol as described in J. Chem. Soc. 127, 442). In this process, the first reaction step is the exchange of chlorine against the hydrogen-sulfide group which is followed by the reduction of the nitro group. The by-product thereby obtained is o-chloroaniline in an amount of up to 10%. The o-aminothiophenol in alkaline solution can be further reacted in this medium by various methods, for example, with carbon disulfide under the formation of 2-mercapto-benzthiazole. The free o-aminothiophenol, however, cannot be isolated by simple neutralization of the alkaline solution. Even when excluding the oxygen of the air, quantitative oxidation occurs to yield 2,2'-diaminodiphenyl disulfide.

In contradistinction thereto, p-aminothiophenol can be obtained by heating p-chloronitrobenzene with sodium sulfide ($Na_2S$ . 9 $H_2O$) under reflux, extracting with ether a small amount of oil which was formed while cooling, acidifying the aqueous solution with acetic acid after saturation with sodium chloride and extracting the freed oil also with ether.

After distillation, p-aminothiophenol is obtained in a yield of 69% of the theoretical amount. When applying this operation method for the preparation of o-aminothiophenol, a yield of 5% in theory is obtained at maximum, while the compound obtained in this process is almost exclusively 2,2'-diamino-diphenyl-disulfide. Correspondingly, also substituted orthoaminothiophenols are obtained in a very small yield, when they are prepared according to this known process. Thus, 4-chloro-2-amino-thiophenol can only be isolated in a yield of 8% of the theory highest; even the reduction of 4-chloro-3-nitrotoluene only results, after neutralization of the reaction mixture, in a quantitative oxidation of the intermediarily formed 4-methylamino-thiophenol.

It was therefore surprising, that o-aminothiophenol compounds could be prepared directly from o-chloronitrobenzenes by the action of hydrogensulfides or sulfides when isolating the free o-aminothiophenols from the alkaline solutions by neutralization with a mineral acid in the presence of about 1.5 to about 2.5 moles of a water-soluble sulfite or of about 0.75 to about 1.25 moles of a water-soluble disulfite per mole of chloronitro compound at a temperature within the range of from about 0°C to about 30°C and at a pH ranging from about 5 to about 7.

The reactions are advantageously carried out in such a manner that the ortho-compound is introduced together with water into the stirring apparatus while working under a protective inert gas, preferably under nitrogen atmosphere, and the water-soluble sulfide or hydrogensulfide, preferably solutions of sodium hydrogensulfide or sodium sulfide, are added to the mixture in usual manner at temperatures within the range of from 80°C to 95°C within a period of from 4 to 6 hours.

After having obtained the corresponding salt of the o-aminothiophenol compound the chloroaniline compound formed as by-product in the reaction is eliminated from the alkaline solution by steam distillation. To avoid the oxidation to the disulfide in the following neutralization, water-soluble sulfites or disulfites, especially alkali sulfites, above all sodium sulfite, are added to the aqueous alkaline aminothiophenolate solution, advantageously at room temperature (20°C). Generally, a water-soluble hydrogensulfite may also be used, in which case the pH value has to be adjusted correspondingly. The sodium sulfite is added in an amount of from about 1.5 to about 2.5 moles, preferably of about 1.6 moles, calculated on the chloronitro compound. An excess of sulfides or hydrogen sulfides does not hamper the oxidation. The use of other reduction agents, such as hydrogen or zinc dust, does not lead to satisfactory results.

The neutralization of the aminothiophenolate solution may be carried out in the presence of a solvent, such as benzene, toluene, ethyl benzene or xylenes, or also in the absence of such a solvent.

The neutralization is carried out at a temperature within the range of from about 0°C to about 30°C, advantageously of from 5°C to 15°C. The acid is added just so rapidly that no local overheating can occur. Suitable neutralization agents are mineral acids, preferably sulfuric acid, phosphoric acid and hydrohalous acids, especially hydrochloric acid. The pH is adjusted at about 5 to about 7, advantageously at 6.

After having completed the neutralization, the organic phase is separated, the mother liquor may be stirred once with solvent, and the reaction product is isolated by distillation in vacuo. Aminothiophenols which decompose during the distillation are dissolved, after the isolation from the mother liquor, again as salts, preferably as sodium salts, and are thus freed from sulfur and disulfide impurities.

Suitable starting materials are o-chloronitrobenzenes which may carry 1 or 2 substituents, such as alkyl groups, preferably methyl, ethyl, propyl or halogen atoms. O-chloronitrobenzene and 2,5-dichloronitrobenzene are preferably used as starting materials.

The technical progress of the invention is that o-aminothiophenols are obtained in pure state in a satisfactory amount by preparing them in a one-stage process starting from o-chloronitrobenzenes. The so far known methods of preparing ortho-aminothiophenols with following isolation in a satisfactory yield which are time-consuming, difficult and costly, are decisively improved by the process of the invention or can even be done without.

The following Examples illustrate the invention, the parts and percentages being by weight.

EXAMPLE 1

473 Parts of o-chloronitrobenzene and 300 parts of water were introduced into a stirring apparatus. The mixture was heated at 80° to 85°C while stirring and at that temperature, within 3 hours under nitrogen atmosphere, 723 parts of an aqueous 36% sodium hydrogensulfide solution and, subsequently, within 1 hour, again 723 parts of this 36% sodium hydrogensulfide solution were added dropwise to that mixture. The nitrogen atmosphere was maintained to protect the following reaction steps. To complete the reaction, stirring was continued for 3 hours at a temperature of from 80°C to 85°C. Then, o-chloraniline formed as by-product was separated by steam distillation. After cooling to room temperature (from 20°C to 30°C)1210 parts of sodium sulfite ($Na_2SO_3.7H_2O$) and 346 parts of xylene were added successively and the pH was adjusted at 6 with 560 parts of 30% hydrochloric acid at from 8°C to 10°C within 3 hours while stirring. After precipitation and separation of the organic phase, the aqueous mother liquor was stirred once with 174 parts of xylene. The o-aminothiophenol was isolated from the organic phase by distillation in vacuo.

Yield: 71% in theory, calculated on o-chloronitrobenzene.
Boiling point: 112°C under 10 mm mercury;
Refraction index $n_{20}^D = 1.17$;
Diazo value: 99.7%.

EXAMPLE 2

473 Parts of o-chloronitrobenzene and 300 parts of water were reacted at from 80°C to 85°C within 7 hours under nitrogen atmosphere with 2,420 parts of an aqueous 30% sodium sulfide solution ($Na_2S$) while stirring. Then, the o-chloroaniline formed as by-product was separated by steam distillation in the same manner as described in Example 1. After cooling to 20°C. 456 parts of sodium pyrosulfite ($Na_2S_2O_5$) and 346 parts of xylene were added and the pH was adjusted at 6 with 210 parts of 30% hydrochloric acid at a temperature of from 8°C to 10°C within 2 hours while stirring. The o-aminothiophenol was isolated in the same manner as described in Example 1.

Yield: 70% in theory, calculated on o-chloronitrobenzene.
Boiling point: 112°C under 10 mm mercury.
Refraction index $n_{20}^D = 1.17$.

Equally good yields were obtained when extracting the o-aminothiophenol with benzene or xylene instead of toluene.

EXAMPLE 3

384 Parts of 2,5-dichloronitrobenzene and 200 parts of water were introduced into a stirring apparatus and reacted with 1,000 parts of 36% sodium hydrogensulfide solution in the same manner as described in Example 1. Then, the 2,5-dichloroaniline obtained as by-product was separated by steam distillation. After cooling to 20°C 806 parts of sodium sulfite ($Na_2SO_3 . 7 H_2O$) were added and the pH was adjusted at 6 with 374 parts of 30% hydrochloric acid at a temperature within the range of from +10°C to 12°C within 2 to 3 hours while stirring. The precipitated solid reaction product was suction-filtered, dissolved in 1,000 parts of a 8% sodium hydroxide solution at 50° to 60°C to separate the sulfur and the disulfide; the solution was suction-filtered from the undissolved moiety and 4-chloro-2-aminothiophenol was precipitated from the filtrate at room temperature (20° C) with 242 parts of 30% hydrochloric acid.

Yield: 59% in theory, calculated on 2,5-dichloronitrobenzene.
Melting point: 44°C;
Diazo value: 99.6%.

EXAMPLE 4

514 Parts of 4-chloro-3-nitro-toluene and 300 parts of water were reacted in the same manner as described in Example 1 at from 90° to 95°C with 1446 parts of a 36% aqueous sodium hydrogen sulfide solution while stirring. Then, the 4-chloro-3-amino-toluene which had formed as by-product was eliminated by steam distillation. After cooling to 20° – 30°C, 1,210 parts of sodium sulfite ($Na_2SO_3 . 7 H_2O$) and 430 parts of xylene were successively added and the pH was adjusted at 6 at a temperature within the range of from 10° to 12°C within from 2 to 3 hours with 565 parts of a 30% hydrochloric acid while stirring. For better separation of the phases, the mixture was heated at 25°C and the mother liquor was stirred with 174 parts of xylene. The 4-methyl-2-amino-thiophenol was isolated from the organic phase by vacuum distillation.

Yield: 60% of the theoretical amount, calculated on 4-chloro-3-nitrotoluene:
Solidification point: 46°C;
Boiling point: 122°C, under a pressure of 10 mm mercury.

Comparison Example

When applying the mentioned process of the preparation of p-amino-thiophenol (cf. J. Am. Chem. Soc. 71, 1747) to the preparation of 4-methyl-2-amino-thiophenol, quantitative oxidation occurs during the neutralization to yield 2,2'-diamino-4,4'-dimethyldiphenyldisulfide.

EXAMPLE 5

576 Parts of 2,5-dichloro-nitrobenzene and 300 parts of water were placed in a stirring apparatus and reacted in the same manner as described in Example 1 with 1,446 parts of a 36% sodium hydrogen sulfide solution at a temperature within the range of from 80° to 85°C. Then, the 2,5-dichloroaniline formed as by-product was separated by steam distillation. After cooling to 20°C 1,210 parts of sodium sulfite and 430 parts of xylene were successively added and the pH was adjusted at 6 at a temperature within the range of from 8° to 12°C during 3 to 4 hours with 550 parts of 30% hydrochloric acid while stirring. After precipitation and separation of the organic phase, the aqueous phase was stirred once with 174 parts of xylene. 4-Chloro-2-amino-thiophenol was isolated from the organic phase, combined by vacuum distillation.

yield: 58% of the theoretical amount, calculated on 2,5-dichloronitrobenzene;
Sodification point: 45°C;
Boiling point: 127°C under a pressure of 10 mm mercury.

Comparison Example

When applying the known operation method used for the preparation of p-amino-thiophenol, the yield of 4-chloro-2-aminothiophenol was only 8% of the theoretical amount at maximum. In this case too, the corresponding disulfide was formed almost exclusively.

We claim:
1. In a process for the preparation of an o-aminothiophenol compound from o-chloro-nitrobenzene-compounds by the action of water-soluble hydrogen-sulpounds or sulfides, the improvement comprising isolating the free aninothiophenol from the alkaline solution by neutralization with mineral acid in the presence of from 1.5 to 2.5 moles of a water-soluble sulfite or of from 0.75 to 1.25 moles of a water-soluble disulfite per mole of o-chloronitrobenzene compound at a temperature within the range of from about 0°C to about 30°C and at a pH ranging from 5 to 7.

2. A process as claimed in claim 1, wherein sodium sulfite is used as water-soluble sulfite.

3. A process as claimed in claim 1, wherein about 1.6 moles of sodium sulfite are used per mole of chloronitrobenzene.

4. A process as claimed in claim 1, wherein the neutralization is carried out at a temperature within the range of from 5°C to 15°C.

5. A process as claimed in claim 1, wherein the pH is adjusted at 6 during neutralization.

6. A process as claimed in claim 1, wherein the reaction is carried out in an atmosphere of inert gas.

* * * * *